(12) United States Patent
Brooks et al.

(10) Patent No.: US 6,427,383 B1
(45) Date of Patent: Aug. 6, 2002

(54) EMERGENCY EXIT SYSTEM FOR AIRCRAFT OR OTHER VEHICLE

(75) Inventors: Christopher J. Brooks, Dartmouth; Albert P. Bohemier, Cole Harbour; Lee R. Miller, Dartmouth, all of (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 0 days.

(21) Appl. No.: 09/485,106

(22) PCT Filed: Aug. 31, 1998

(86) PCT No.: PCT/CA98/00739
§ 371 (c)(1),
(2), (4) Date: Feb. 3, 2000

(87) PCT Pub. No.: WO99/07600
PCT Pub. Date: Feb. 18, 1999

Related U.S. Application Data
(60) Provisional application No. 60/054,794, filed on Aug. 5, 1997.

(51) Int. Cl.⁷ ............................................. E05B 65/10
(52) U.S. Cl. ................. 49/141; 49/57; 49/465
(58) Field of Search .................... 49/141, 57, 463, 49/465; 292/38, 39; 296/146.6

(56) References Cited

U.S. PATENT DOCUMENTS

| | | | | |
|---|---|---|---|---|
| 1,133,948 A | * | 3/1915 | Florcken | 292/33 |
| 1,136,254 A | * | 4/1915 | Mosler et al. | 70/118 |
| 1,919,328 A | * | 7/1933 | Hansen | 49/395 |
| 2,102,250 A | * | 12/1937 | Zeeb et al. | 49/141 |
| 3,072,286 A | * | 1/1963 | Cusumano | 220/326 |
| 3,344,465 A | * | 10/1967 | Neumeister | 16/224 |
| 3,584,905 A | * | 6/1971 | Emenaker | 292/38 |
| 3,851,845 A | * | 12/1974 | Edwards | 244/129.5 |
| 3,851,846 A | * | 12/1974 | Edwards | 244/129.5 |
| 3,885,761 A | * | 5/1975 | Pendergast et al. | 244/121 |
| 3,975,981 A | * | 8/1976 | Seifert | 89/1.14 |
| 4,117,454 A | * | 9/1978 | Fabry et al. | 340/433 |
| 4,199,176 A | * | 4/1980 | Kelly | 292/38 |
| 4,999,949 A | * | 3/1991 | Granlund | 49/383 |
| 5,076,015 A | * | 12/1991 | Manzalini | 49/192 |
| 5,700,043 A | * | 12/1997 | Rohard et al. | 292/256.6 |
| 5,826,824 A | * | 10/1998 | Martin et al. | 244/129.3 |

FOREIGN PATENT DOCUMENTS

| | | | | |
|---|---|---|---|---|
| CA | 481567 | * | 3/1952 | 292/38 |
| DE | 1008604 | * | 5/1957 | 292/38 |
| DE | 2128721 | * | 2/1972 | 292/38 |
| DE | 2119253 | * | 10/1972 | 292/38 |
| DE | 24 33 525 | * | 1/1976 | |
| DE | 2502150 | * | 7/1976 | 292/38 |
| EP | 0 592 317 | * | 4/1994 | |
| FR | 994445 | * | 8/1951 | 292/38 |
| GB | 761627 | * | 11/1956 | |
| GB | 1328360 | * | 8/1973 | |

* cited by examiner

*Primary Examiner*—Gregory J. Strimbu
(74) *Attorney, Agent, or Firm*—George A. Seaby

(57) ABSTRACT

An emergency exit system for use on a helicopter or other aircraft includes a frame (4) defining an opening (6) for receiving a panel (8) to close the opening (6); a plurality of latches (10, 117) for releasably securing the panel (8) in the opening (6); a plurality of release mechanisms (12); a cable (45, 118) extending around at least a major portion of the frame (4) for releasing the panel (8); and a plurality of actuators (14) strategically located around the opening and connected to the cable (45, 118), whereby actuation of any one of the actuators (14) causes simultaneous release of all of the latches (10, 117) so that the panel (8) can be jettisoned.

11 Claims, 10 Drawing Sheets

EMERGENCY EXIT SYSTEM FOR AIRCRAFT OR OTHER VEHICLE

This application claims the benefit of provisional application 60/054,794 filed Aug. 5, 1997.

BACKGROUND OF THE INVENTION

This invention relates to an emergency exit system and in particular to an emergency exit system for use on a helicopter or other aircraft.

Vehicle accidents occurring in water have a lower survival rate than accidents occurring on land. In water accidents, the vehicles usually sink very rapidly, either in an upright or inverted position. Underwater conditions are drastically different from land based conditions. Visibility is reduced—the majority of people can see only 1.5 meters underwater and 3.1 meters in the best lit conditions. Survivors of a crash or forced landing must depend on their breath-holding ability to make a successful escape. Generally, a person's breath-holding ability is reduced 25–50% in water under 15° C. Maximum breath-holding time can be as short as 10 seconds. Survivors are often disoriented due to the sudden immersion in water, loss of gravitational references, poor depth perception, nasal inhalation of water and darkness. Disorientation is magnified when the vehicle is inverted. Under the latter condition, finding a handle to jettison an escape door or window, which is a simple procedure to execute in an upright position on dry land, can be a most challenging task even if the handle is only a few centimeters away from the survivor's hand.

Usually handles for open escape doors or windows are small, and are positioned between knee and chest level. The various positions would not be obvious to the survivor unless he or she is familiar with the particular escape system Most existing mechanisms are adapted to remove an entire door or window, including the frame, requiring a complicated jettison mechanism, which is not always dependable. Moreover, existing systems do not provide feedback to indicate that the door, window or hatch as been successfully jettisoned.

GB-A-761 627 and U.S. Pat. No. 3,851,845 disclose systems for the jettisoning of aircraft canopies or doors which are inappropriate for use in a door or window release. The U.S. reference teaches the use of lever or a lever and a handle combination for releasing a door. When submerged in water such a system could be difficult to operate, particularly when it is necessary to operate a handle and a separate lever to effect release of the door.

BRIEF SUMMARY OF THE INVENTION

The object of the present invention is to provide an emergency exit system of the type which includes a plurality of actuators adapted to operate independently of one another to effect release of a window or door panel to provide an escape exit.

Accordingly, the present invention relates to an emergency exit system including a frame for mounting in a vehicle, said frame having an opening for closing by a panel, a plurality of spaced apart latch means for releasably latching said panel in the frame; release means for simultaneously releasing all of said latch means; and principal actuation means located at a plurality of locations around the periphery of said frame for actuating said release means when any of said actuation means is actuated, characterised by cable means forming part of said release means and extending around a substantial portion of said frame to interconnect the release means associated with each said latch means.

BRIEF DESCRIPTION OF THE DRAWINGS

The invention is described below in greater detail with reference to the accompanying drawings, which illustrate preferred embodiments of the invention, and wherein.

DETAILED DESCRIPTION OF THE INVENTION

Figure 1:
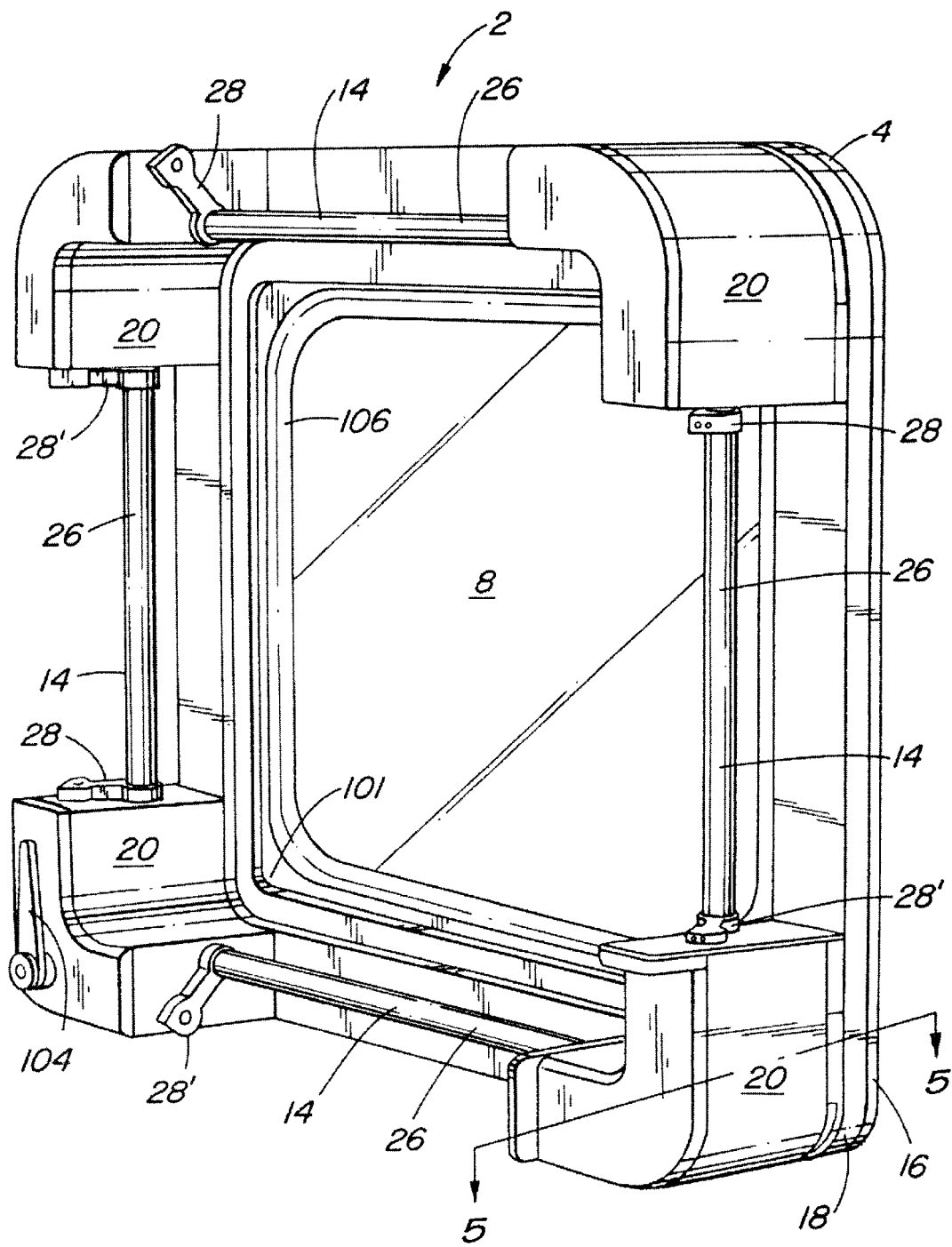
FIG. 1 is a perspective view of a window emergency exit system in accordance with the invention.
Figure 2:
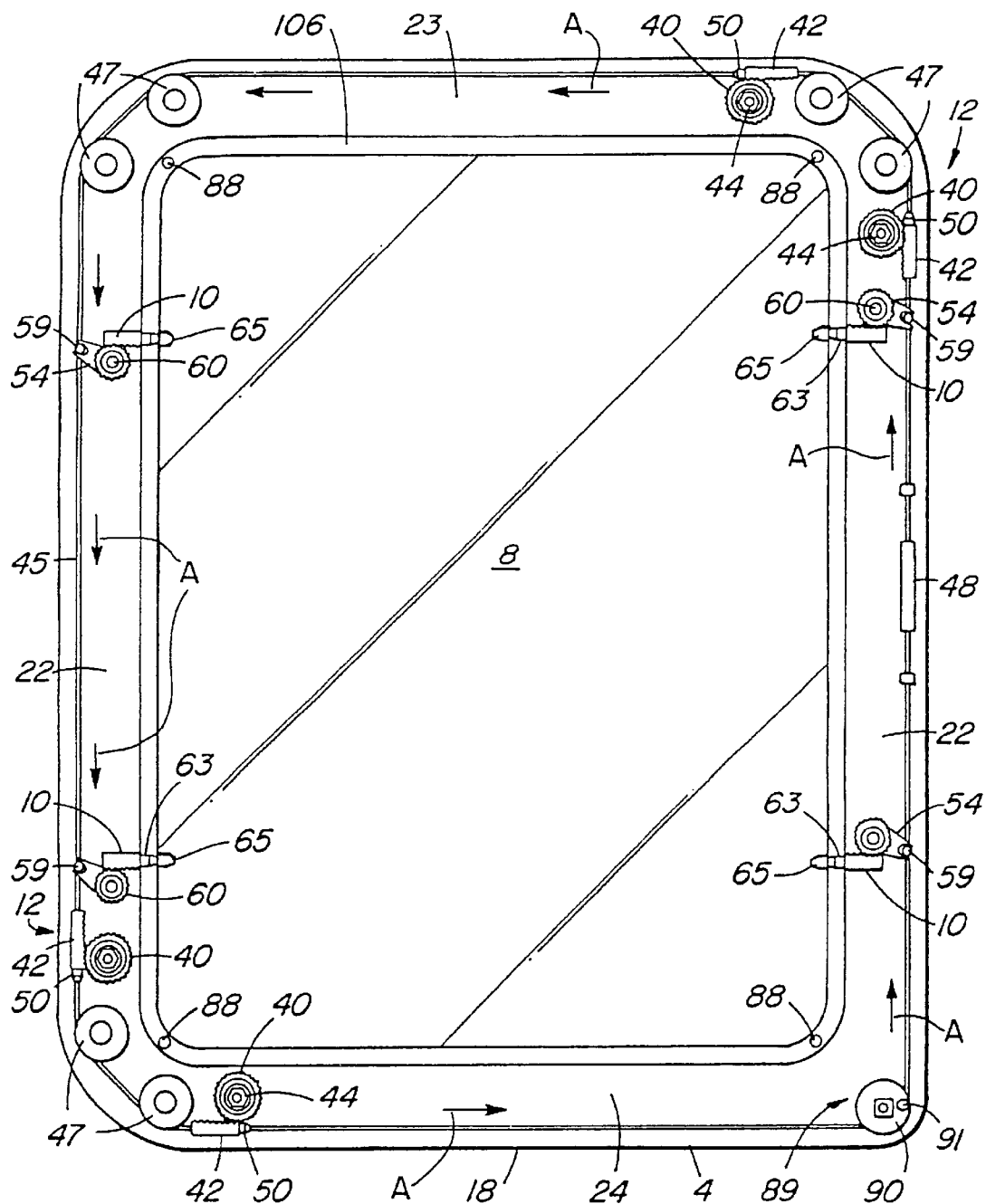
FIGS. 2 and 3 are front elevation views of the interior of the exit system of FIG. 1 with parts removed and showing the plungers in the panel latching and panel release positions, respectively.
Figure 3:
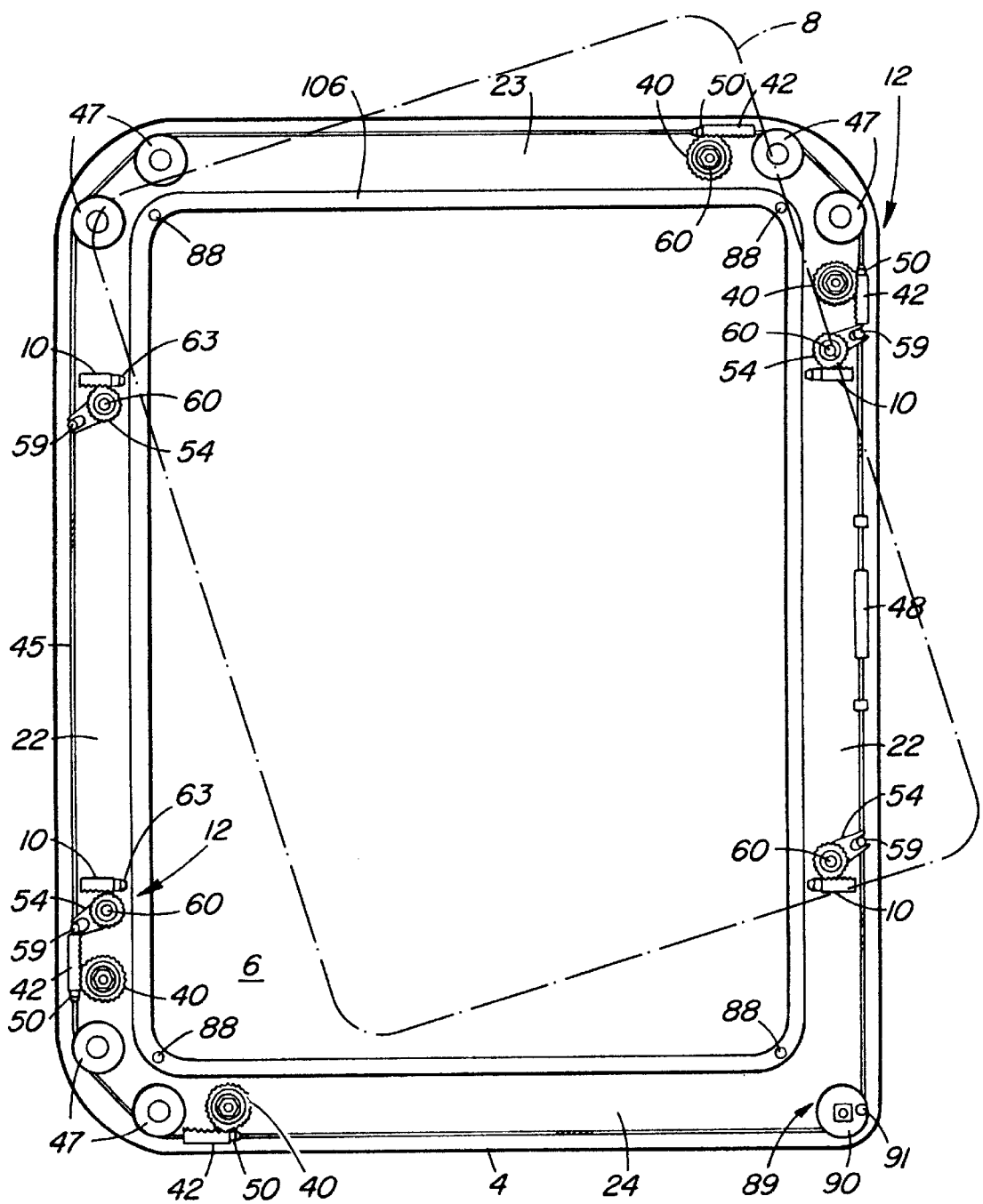

Referring to FIGS. 1 to 3, one embodiment of the emergency exit system, which is generally indicated at 2, is a window for mounting in the fuselage of an aircraft such as a helicopter (not shown). However, the system may also be a door, a hatch or any other type of exit adapted for mounting in a closed body such as the body of a vehicle, e.g. a car, bus or truck, the fuselage of an airplane or a wall of a building.

Generally, the emergency exit system 2 includes a rectangular frame 4 defining a central opening 6, a closure panel 8 such as a metal sheet or window releaseably secured in the opening 6 by a plurality of latches 10 extending from the frame 4; a release mechanism 12 (FIGS. 2 and 3) in the frame 4 and an actuation mechanism on the inner side of the frame 4 including four bars 14 (FIG. 1), which are independently operable to simultaneously effect the release of all of the latches 10 to enable jettisoning of the closure panel 8 to provide an emergency exit.

The frame 4 includes interconnected exterior and interior panels 16 and 18, respectively. The interior panel 18 is sufficiently thick to contain the actuation mechanism 12 (FIG. 2 or 3). Four closed compartments 20 extend from the corners of the inner panel 18 for receiving the bars 14 therebetween. The compartments 20 contain parts of the release mechanism 12 and an emergency lighting assembly 21 (FIG. 6), both of which are described in detail below.

In contrast to prior art emergency exit systems, the exit system 2 of the present invention includes a plurality of actuation bars 14. The bars 14 are mounted in obvious locations, i.e. they extend along the interior of the sides 22 and the top and bottom ends 23 and 24, respectively of the frame 4, so that they can be easily located and accessed, thus significantly improving the chances of escape and survival of trapped survivors. Each bar 14 includes an elongated cylindrical body 25 with a press fitted lever 26 at one end thereof. The bars 14 are individually connected to the release mechanism 12 in such a manner as to be independently operable. Actuation of any one of the bars 14 will simultaneously disengage all of the latches 10 to release the panel 8 from the frame 4. This minimizes the number of operations and amount of energy required by the survivor to release the panel 8. All of the energy of the operator will be applied to the release of the panel 8 rather than for actuation of the remaining bars 14. Moreover, if one bar 14 malfunctions, another may be used to serve the same function. The panel 8 is jettisoned by pulling any one of the bars 14 towards the operator and away from the frame 4.

The bars 14 are rotatably mounted relative to the compartments 20 between first and second limit positions. In the first limit position, the panel 8 is secured in the opening 6. In the second limit position, the panel 8 is released from the frame 4.

Figure 4:
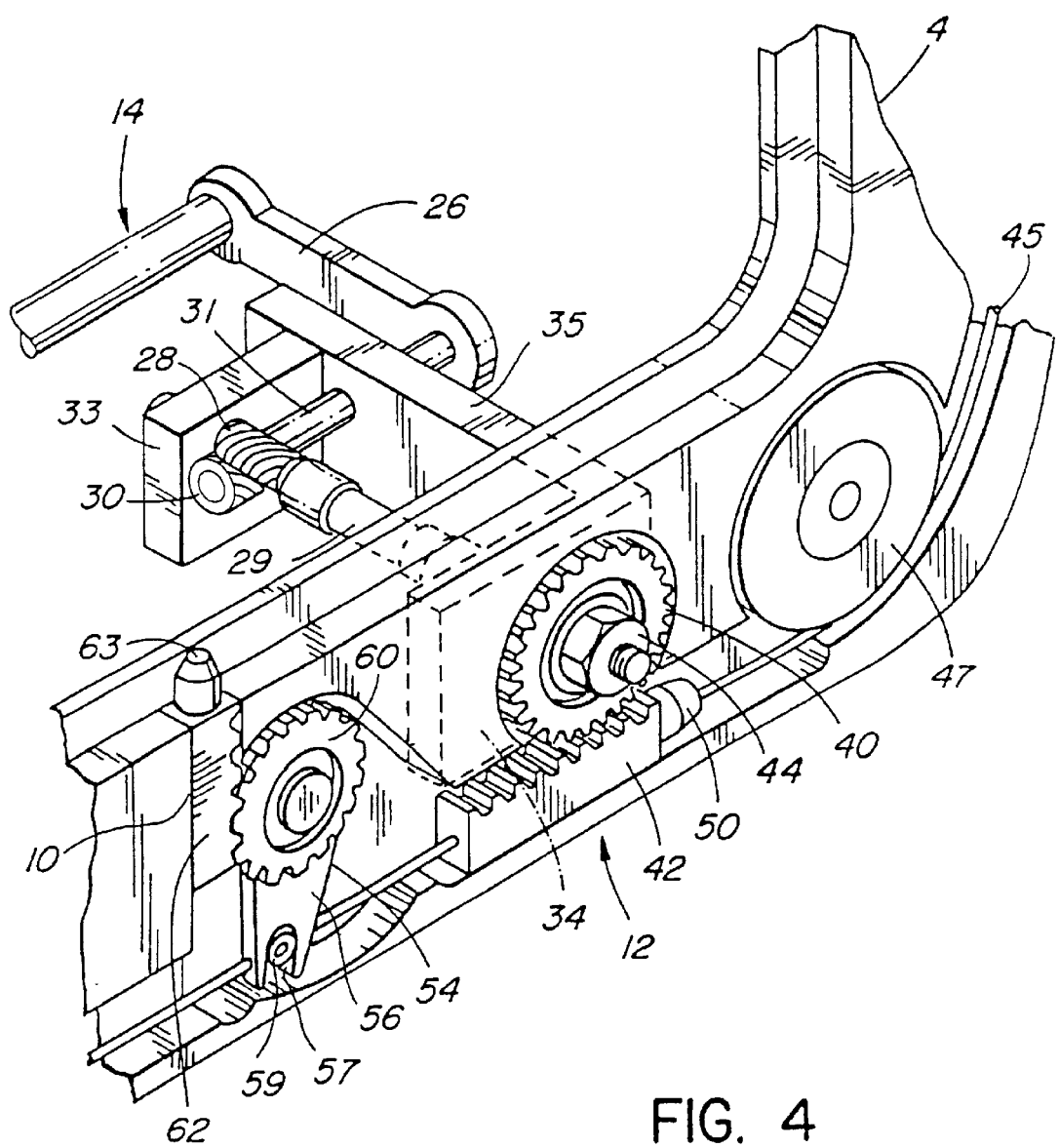
FIG. 4 is a isometric view of portions of actuation and release mechanisms used in the exit system of FIG. 1.

Each release mechanism 12 is connected to one end of each bar 14. Referring to FIGS. 2 to 4, rotation of one bar 14 is transmitted to its associated release mechanism 12 and then to the plurality of latches 10 to simultaneously retract each latch 10 inwardly into the frame 4 to release the panel 8. The release mechanism 12 is switchable between a locked or latched position (FIG. 2) in which the latches 10 extend inwardly from the frame 4 and a release position (FIG. 3) in which the latches 10 are retracted into the frame 4.

Each release mechanism 12 is designed to translate rotational movement of the bar 14 and a lever 26 at one end of the bar into movement necessary to disengage the latches 10. Referring to FIG. 4, each release mechanism 12 includes a helical gear or rack 28 mounted on a shaft 29 near one end thereof. The gear 28 is connected by a gear or pinion 30 and a shaft 31 to a lever 26. Rotation of the lever 26 around the longitudinal axis of the shaft 31 results in a corresponding rotation of the shafts 29 and 31. The shaft 29 is rotatably mounted in ball bearings (not shown) in arms 33 and 34 of a generally C-shaped bracket 35. The shaft 31 is also mounted in the bracket 35 perpendicular to the shaft 29. It will be appreciated that the bracket 35 and the shafts 29 and 31 are housed in the compartments 20. The end of the shaft 29 extending through the arm 34 of the bracket 35 extends through an opening in the frame 4 and carries a pinion 40. The pinion 40 meshes with a rack 42 for imparting longitudinal movement thereto when the pinion is rotated. The pinion 40 is retained on the shaft 29 by a key (not shown) and a nut 44.

A cable 45 extends through and is freely slidable in the rack 42. The cable 45 extends around idler pulleys 47 located at the corners of the frame 4. A conventional cable tensioner 48 (FIGS. 2 and 3) maintains the cable 45 under the desired tension. A stop 50 is fixedly mounted on the cable 45 for engaging one end of the rack 42. When the rack 42 is moved in one direction (indicated by arrows A in FIG. 2), it pushes against the stop 50 to move the cable 45 in the same direction. Movement of the cable 45 causes rotation of a second lever 54 (FIG. 4) mounted in the frame for operating a latch 10. The lever 54 includes a tapering body 56 with a generally U-shaped notch 57 in an outer end thereof for receiving a pin 59 attached to the cable 45. Thus, movement of the cable 45 will cause rotation of the lever 54, the inner end 60 of which is rotatably mounted in the frame 4. Such inner end 60 of the lever 54 includes teeth defining a pinion for engaging a rack 62 slidably mounted in the frame 4. The rack 62 forms part of the latch 10. A pin 63 with a tapered outer end extends outwardly from the rack 62 for retaining the panel 8 in the frame 4. When the pin 63 is retracted, the panel 8 is released for jettisoning.

It is readily apparent that rotation of one lever 26 will cause movement of the cable 45, and consequently simultaneous release of all of the latches 10. Movement of the lever 26 and the cable 45 in the opposite direction will result in extension of the pin 63 to the latched or locking position (FIG. 4). In the locked position the pins 63 engage grooves or indentations 65 (FIG. 2) in the panel 8. From FIGS. 2 and 3, it will be noted that a rack 42 and pinion 40 arrangement is associated with each bar 14, so that rotation of any bar 14 results in the release of all of the latches 10.

Figure 5:
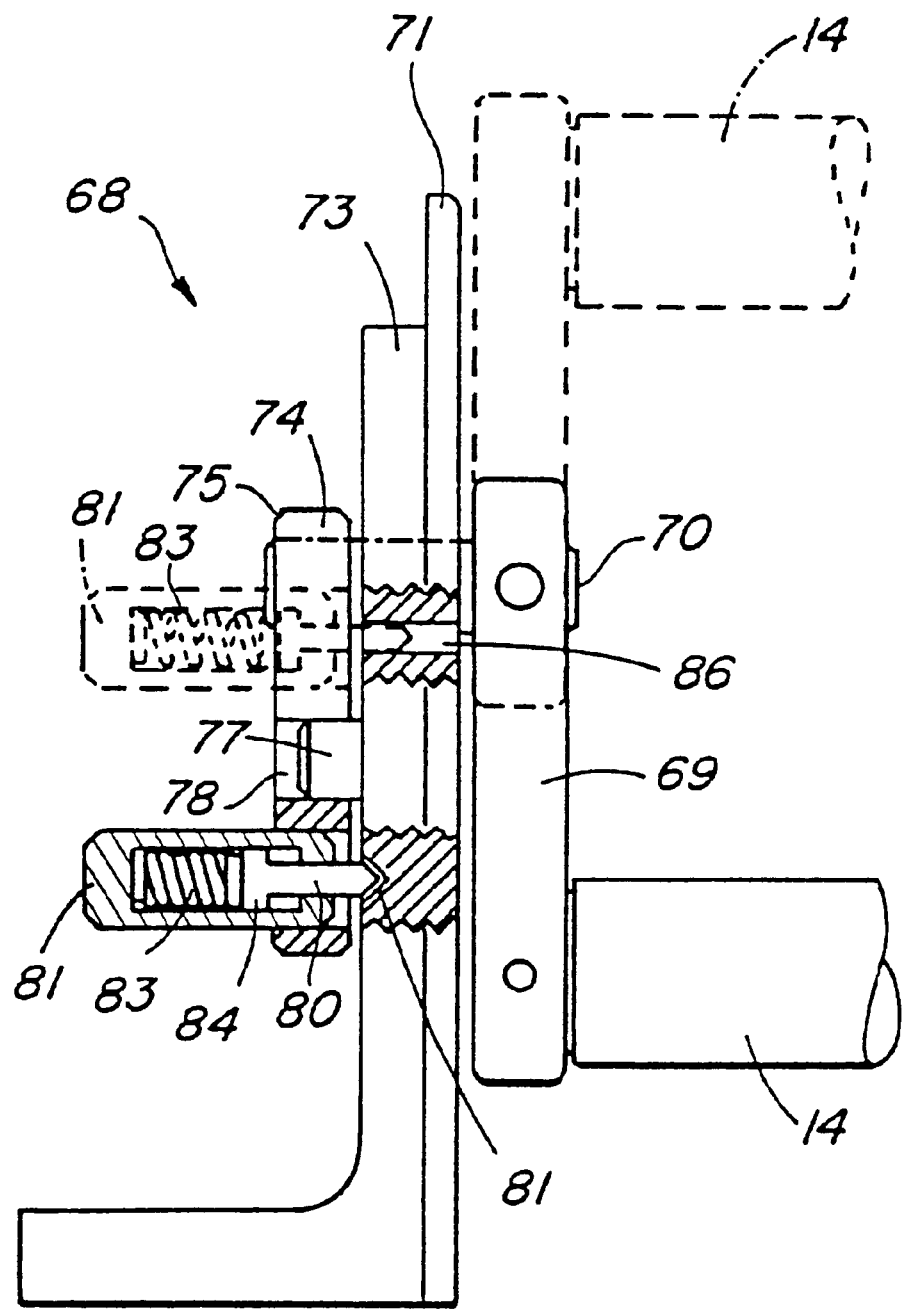
FIG. 5 is a schematic, partly a sectioned view taken along line 5—5 of FIG. 1.

Once the latches 10 have been release, the bars 14 are locked in the release position by a locking mechanism generally indicated at 68 in FIG. 5. Each locking mechanism 68 includes a lever 69 (FIGS. 1 and 5) mounted on the end of each bar 14 opposite to the end carrying the lever 26. The lever 69 is mounted on one end of a shaft 70, which is rotatably mounted in one end 71 of the compartment 20 and in an L-shaped bracket 73. An arm 74 is mounted on the inner end 75 of the shaft 70 for rotation therewith. The arm 74 is guided between the panel latched and release positions by a pin 77 extending inwardly from the bracket 73 into an arcuate slot 78 in the arm. The arm 74 and consequently the lever 69 are releasably retained in the panel latched position by a detent pin 80, which extends into a shallow conical depression 81 in the bracket 73. The pin 80 extends outwardly from a cylindrical barrel 81 mounted in the end of the arm 74 opposite to the end 75 receiving the shaft 70. A helical spring 83 bears against the head 84 of the pin 80 for biasing the outer end thereof into the depression 81. When the bar 14 is rotated from the panel latching position (shown in solid lines in FIG. 5) to the panel release position (shown in phantom outline in FIG. 5) the arm 74 is also rotated. The pin 80 escapes from the depression 81 and is rotated with the arm 74 to the panel release position in which the pin 80 encounters a hole 86 extending through the bracket 73 and the end 71 of the compartment 20. Thus, the arm 74 and consequently the lever 69 and the bar 14 are locked in the panel release position.

Referring to FIGS. 2 and 3, a plurality of ejectors 88 are provided on the interior of the frame 4. The ejectors 88 are spring loaded plungers for biasing the panel 8 outwardly from the frame 4. Immediately following release of the panel 8 by the latches 10, the ejectors 88 push the panel 8 outwardly to clear the opening 6.

In operation, one or more bars of the actuation mechanism is pulled towards the operator and away from the limit positions defined by the detent pin 80, the depression 81 and the hole 86. Rotation of a bar 14 causes pivoting of a lever 26 on one end of the bar 14, and consequently rotation of the shafts 31 and 29, and the pinion 40. Rotation of the pinion 40 results in movement of the rack 42 and the cable 45 which translates into rotation of all of the levers 54 to release the latches 10. The panel 8 is thus free to move and is pushed out of the frame 4 by the ejectors 88.

An auxiliary actuator generally indicated at 89 (FIGS. 2 and 3) for the panel 8 includes a pulley 90 rotatably mounted in one corner of the frame 4. A notch in the pulley 90 engages a pin 91, which is attached to the cable 45. The auxiliary actuator can override the release mechanism 12. The pulley 90 is rotated by either of two levers defined by handles 94 (one shown—FIG. 1) mounted on the ends of a shaft carrying the pulley. The handles 94 are located on the interior and exterior lower corners of the frame 4 (i.e. inside and outside the window). Rotation of either handle 94 results in simultaneous release of all latches 10.

With reference to FIG. 1, a preferred form of panel 8 includes a sash 96 carrying a panel, which is sealed in the sash 96 by a rubber molding 98. The panel 8 can be removed from the sash 96 by removing the molding 98.

Once removed, the panel 8 can be re-installed in the opening 6 by pushing the panel as far as possible into the opening to compress the plungers of the ejectors 88. The detent pins 80 are pushed out of the holes 86, and the bars 14 are rotated to return the pins 80 to the latched position in the recesses 81. The panel 8 is secured in the opening 6 by rotating either one of the handles 94 to return the latches 10 to locked position.

Figure 6:
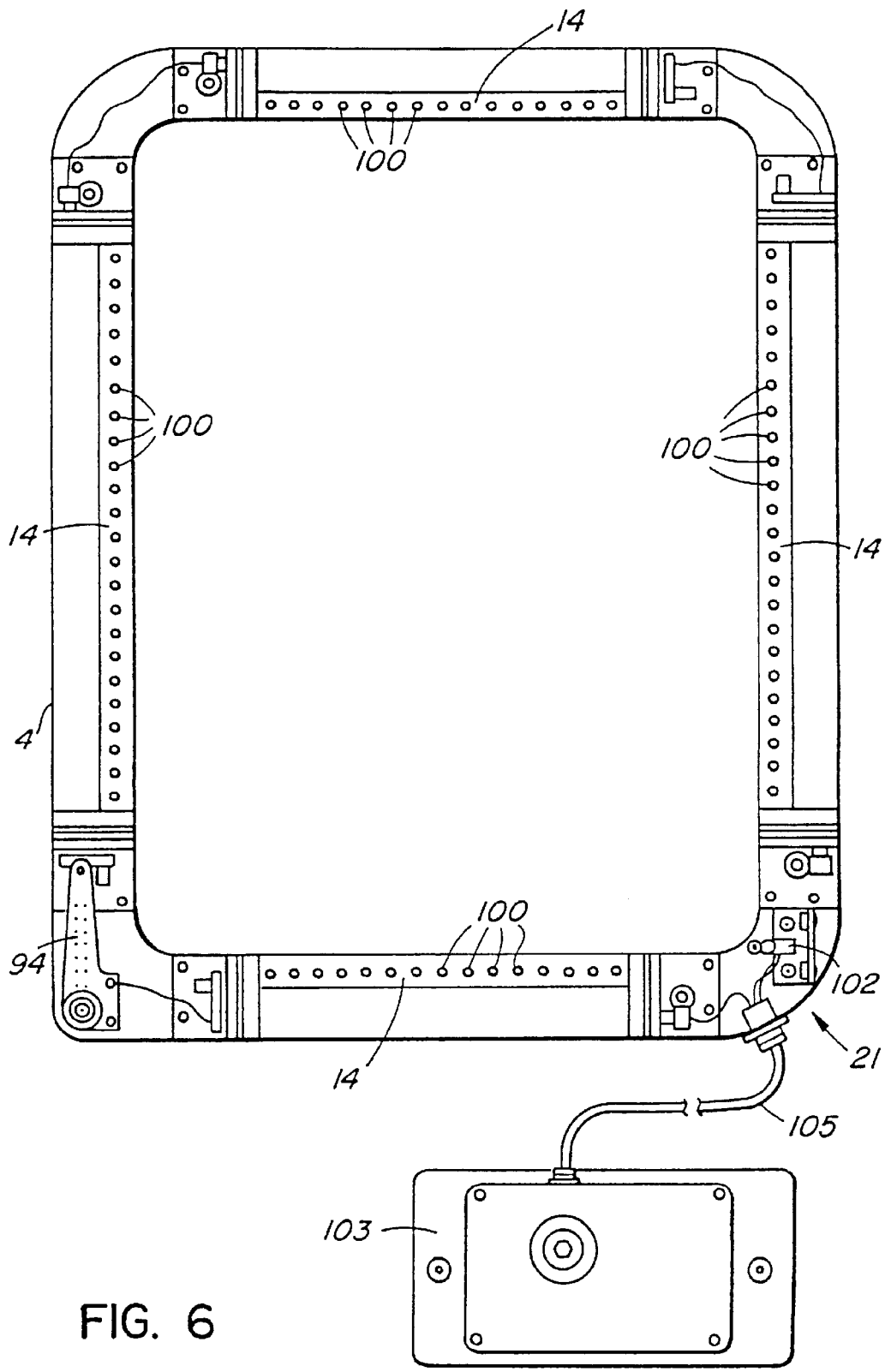
FIG. 6 is an elevation view of the interior of the exit system of FIG. 1 with parts removed.

Referring to FIG. 6, the emergency lighting assembly 21 is used to illuminate the opening 6 and to provide an indication where the exit system is located and whether the panel 8 is latched or released. When the lighting is constant, the panel 8 is in the latched condition, and strobe lighting indicates that the panel 8 has been released. The lighting system 21 includes a plurality of high intensity light emitting diodes (LEDS) 100 in the bars 14 and on the auxiliary release 89, a strobe switch 102 on the frame 4 to indicate when the panel 8 has been jettisoned, light actuation elements (not shown) and a power pack 103 external to the frame 4. The power pack 103 is connected to the remainder of the lighting system by a cable 105. The power pack 103 includes a microprocessor (not shown) for controlling the lighting system.

The light actuation elements include an immersion sensor, an impact sensor, a roll over sensor and a pilot operated on-off switch (none of which are shown). The sensors are mounted on the aircraft fuselage or incorporated in the power pack 103. The immersion sensor is triggered when the aircraft is submerged in water, the impact sensor is triggered when a predetermined impact force has been exceeded, and the roll over sensor is triggered when the aircraft rolls over. The pilot switch is mounted on the console of the aircraft, permitting manual activation of the lighting system. All of the sensors and the switch are wired in parallel so that any one of them can be used to activate the emergency lighting system.

When the lighting system is activated, the LEDs 100 will be simultaneously activated to illuminate the release bars 14 and the handles 94. The bars 14 and the handles 94 will remain illuminated until the system is deactivated, or until the panel 8 is released and jettisoned. The strobe mode is activated by one of the spring loaded ejectors 88 which closes the strobe switch 102. Strobe lighting will continue as long as the panel 8 is free of the frame 4.

A second embodiment of the emergency exit system for use in a door is illustrated in FIGS. 7 to 10. The second embodiment of the system includes a frame 4 with an opening 6 therein which is closed by a panel 8 (in this case defining a door). The panel 8 includes a window 110, and flanges 111 extending along the periphery thereof for sealing against the fuselage 112 (FIG. 9) of a helicopter in the closed position.

The panel 8 is mounted in the frame 4 by means of hinges 113, which permit rotation of the panel 8 between the open and closed positions. The panel 8 is normally opened and closed using a handle 114 and latch pins 115 (FIG. 7), all of which are connected to the handle 14. An actuating mechanism similar to the same mechanism in FIGS. 1 to 4 includes a plurality of independently operated bars 14 for initiating release of the door panel 8. The bars 14 are connected to a release mechanism generally indicated at 12 (FIG. 8) housed in compartments 116 in the manner described above in connection with FIGS. 1 to 4. In the embodiment of the invention, movement of one of the bars 14 to the release position causes actuation of the release mechanism, which includes the latches 117. The release mechanism also releases the hinges 113 to release the panel 8 completely from the frame 4. The latches 117 are interconnected by a cable 118 (FIG. 8), which extends around pulleys 119 at the bottom corners of the frame 4 and returns around the top end thereof, i.e. the cable 118 extends in two rows around the top and sides of the frame 4. Grooved rollers 122 are provided in the frame 4 for guiding the cable 118 around the frame.

Figure 7:
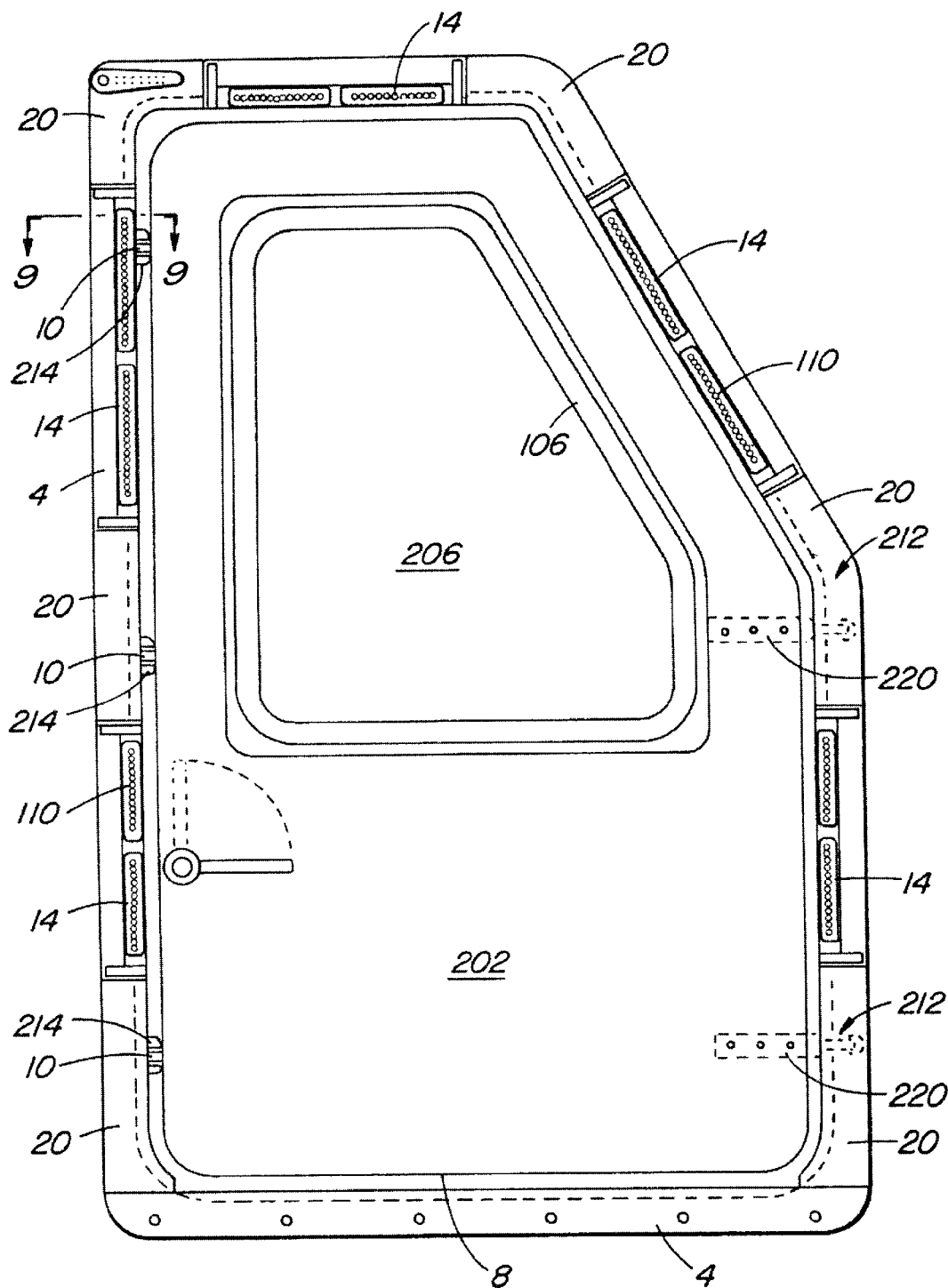
FIG. 7 is a front elevation view of the interior of a door emergency exit system.

Each latch 117 is pivotally mounted on the frame 4 to secure the panel 8 in the opening 6. An associated plunger 115 is mounted in the panel 8 adjacent the latch 117 to permit latching and unlatching of the door panel 8 during normal operation. More specifically, during normal operation, the door panel is latched by rotating the handle 114 (counterclockwise as shown in FIG. 7) to cause the plunger 115 to extend outwardly from the side of the panel into engagement with the latches 117. Rollers 122 on the outer ends of the plunger 115 engage the inner sides of the latches 117 (FIGS. 7 and 9. By rotating the handle 114 in the opposite direction, the plungers 115 are retracted into the panel 8 to unlatch the panel permitting swinging of the door panel on the hinges 113 to the open position (FIG. 8).

Figure 8:
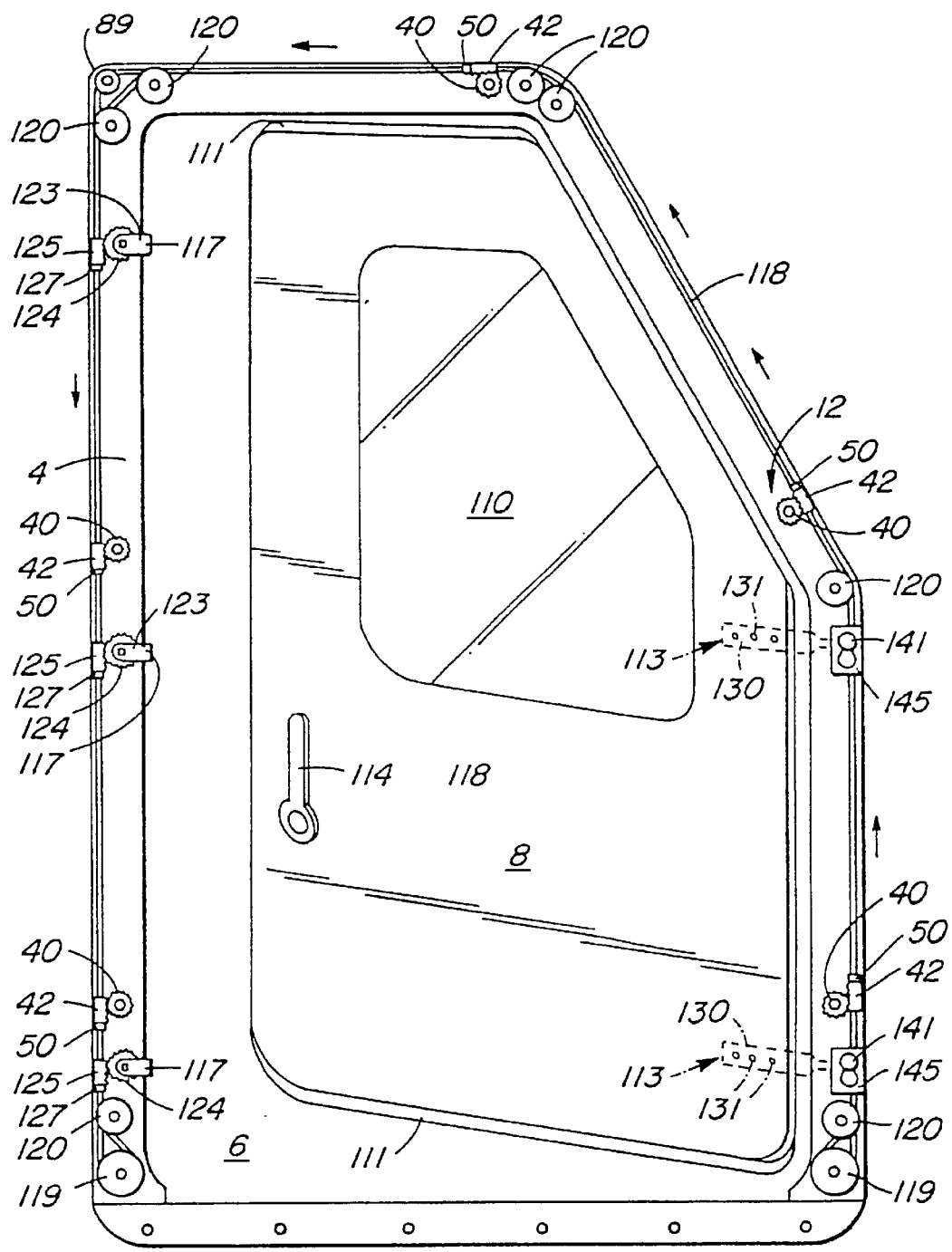
FIG. 8 is a front elevation view of the door exit system of FIG. 7 with parts removed.
Figure 9:
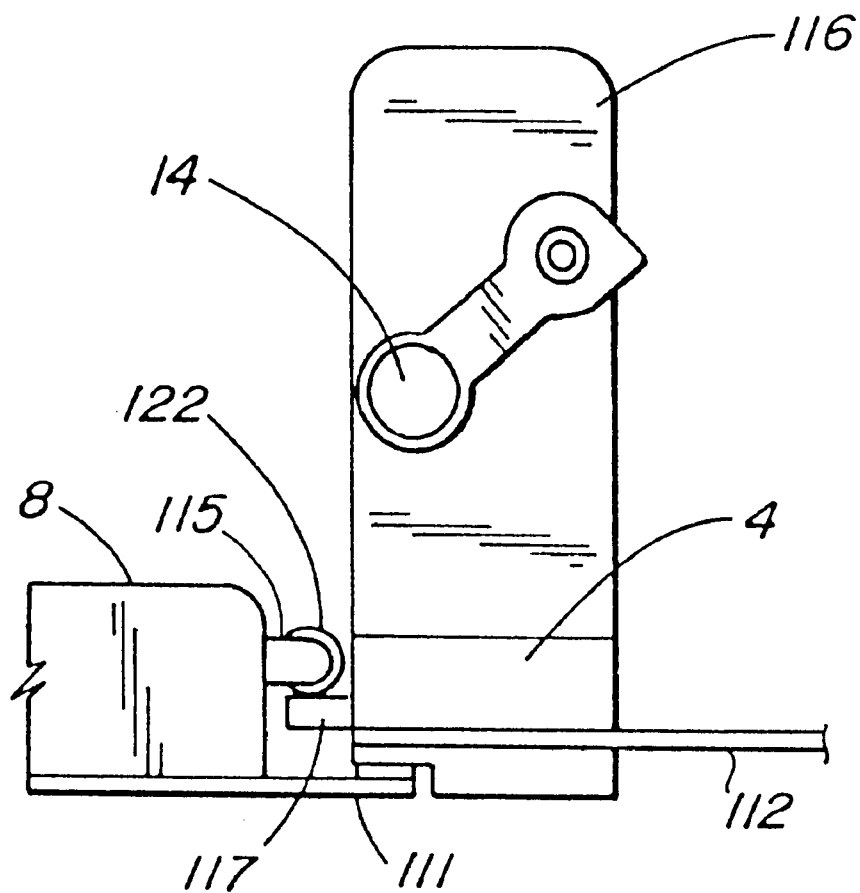
FIG. 9 is a schematic, cross section taken generally along line, 9—9 of FIG. 7.

As best shown in FIG. 8 each latch 117 includes an arm 123 connected to a pinion 124 (FIG. 8) rotatably mounted in the frame 4. The pinion 124 meshes with a rack 125 mounted on the cable 118. The rack 125 is engaged by a stop 127 (similar to the stops 50). When the cable 118 moves, the stop 127 moves the rack 125 to rotate the pinion 124 which in turn causes pivoting of the tab 123 through 45 to release the latch 115.

Figure 10B:
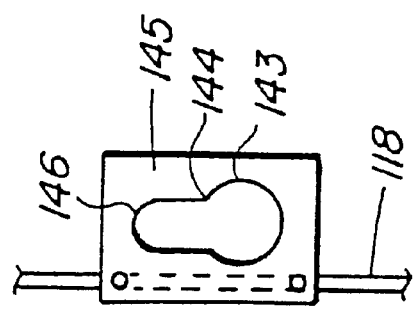
FIG. 10B is a front view of a plate and a section of cable for releasably retaining the hinge assembly of FIG. 1
Figure 10A:
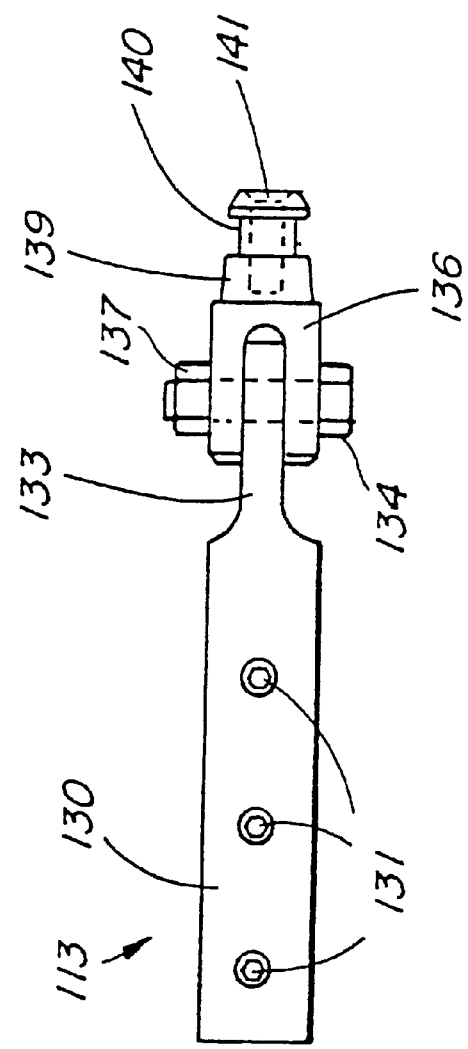
FIG. 10A is a front view of a hinge assembly used in the exit system of FIG. 7.

Referring to FIGS. 10A and 10B, each hinge assembly 113 includes an arm 130 with holes therein for receiving bolts 131. A narrow end 133 of the arm 130 is rotatable mounted on a pin defined by a bolt 134 in a clevis 136. The bolt 134 is retained in the clevis 136 by nut 137. The body 139 of the clevis 136 tapers to an annular groove 140 and a head 141. The head 141 is inserted into the large end 143 of a keyhole slot 144 in a plate 145 mounted on the cable 120. By moving the head 141 into the narrow end 146 of the slot 144, the clevis 136 and the plate 130 are retained in engagement with the cable 120. When the cable 120 moves (upwardly in FIG. 10B), the clevis 136 and consequently the entire hinge is release. At the same time, the arms 123 of the latches 117 rotate 45 to release the plungers 115, whereby the entire door panel 8 is released for jettisoning.

The second embodiment of the invention also includes an auxiliary release mechanism 89 similar to the same mechanism in the first embodiment of the invention.

We claim:

1. An emergency exit system comprising a frame for mounting in a vehicle; an opening in said frame through which the vehicle can be entered or exited; a panel for closing said opening; a plurality of plungers slidable in said frame for movement between panel latching and panel release positions, said plurality of plunger releasably retaining the panel in the frame; a plurality of release mechanisms for moving said plungers from said panel latching position in which said panel is retained in the frame to said panel release position in which said panel is removable from said frame; a plurality of principal actuators located at several, spaced apart locations around a periphery of the frame, said principal actuators including a plurality of bars rotatably mounted to frame and connected to said plungers, each bar being adapted to individually move said plungers to the panel release position when said bar is actuated; and a cable extending around a substantial portion of said frame connecting said principal actuator bars to said release mechanisms, said release mechanisms including first racks and pinions connecting said bars to said cable for moving said cable when one of said bars is rotated; and second racks and pinions connecting said cable to said plungers for moving the plungers from the panel latching position to the panel release position, whereby, when any one of the bars is rotated, all of the plungers are simultaneously moved to the panel release position, permiting ejection of the panel from the frame.

2. The emergency exit system of claim 1 including an auxiliary actuator for simultaneously operating all of said release mechanisms independently of said principal actuators.

3. The emergency exit system of claim 1, including an ejector for ejecting said panel from said frame when the panel is released by said plungers.

4. The emergency exit system of claim 1, including a lighting assembly to illuminate an area of said opening facilitate locating of the emergency exit system.

5. The emergency exit system of claim 4, wherein said lighting assembly includes a strobe switch in said frame for causing strobing of the lighting assembly when the panel has been ejected.

6. The emergency exit system of claim 1, including locks for locking said release mechanisms in a release position.

7. The emergency exit system of claim 1, wherein said panel is a window.

8. The emergency exit system of claim 7, wherein said release mechanisms include first levers connecting said bars to said cable for moving said cable and consequently said plungers to the panel release position.

9. The emergency exit system of claim 8, wherein said release mechanisms include second levers connected to said plungers; and gears interconnecting said first and second levers for moving said plungers to the panel release position.

10. The emergency exit system of claim 8, wherein said cable extends completely around said frame.

11. The emergency exit system of claim 1, wherein said panel defines a door, and said release mechanisms include latches pivotally mounted on said frame for engaging said door and hinges on one side of said door permitting opening of the door, said hinges being released from said frame when said latches are released.

* * * * *